United States Patent [19]

Potucek

[11] Patent Number: 4,941,001

[45] Date of Patent: Jul. 10, 1990

[54] NON-IMPACT DOT PRINT HEAD WITH RESET

[75] Inventor: Martin Potucek, Rochester, N.Y.

[73] Assignee: Eastman Kodak Company, Rochester, N.Y.

[21] Appl. No.: 385,121

[22] Filed: Jul. 26, 1989

[51] Int. Cl.[5] ............................................. G01D 15/00
[52] U.S. Cl. ..................................... 346/154; 364/519
[58] Field of Search ................... 346/154; 400/54, 70; 364/518, 519

[56] References Cited

U.S. PATENT DOCUMENTS 4,279,523 7/1981 Ringle ................................. 346/154
4,750,101 6/1988 Ayers ................................. 346/154

Primary Examiner—Arthur G. Evans
Attorney, Agent, or Firm—Milton S. Sales

[57] ABSTRACT

A dot printer includes a print head with a plurality of recording elements, a power supply for driving the recording elements, a source of logic supply voltage, a source of data signals, and means for supplying a first reset signal to the print head to place the recording elements in a safe state in the absence of data signals. To provide for the protection of the recording elements in the event of a power drop even if no reset signal is received from the printer, a second reset signal source is provided on the print head to place the recording elements in a safe state in the absence of data signals if the logic supply voltage goes below a predetermined value.

12 Claims, 5 Drawing Sheets

NON-IMPACT DOT PRINT HEAD WITH RESET

BACKGROUND OF THE INVENTION

1. Technical Field

This invention relates generally to dot printers, and more particularly to internal means to protect the print head when power is applied in the absence of data and logic signals.

2. Background Art

Prior art print heads include a first electrical connection for both the LED and the logic power supplies, and a second connection for the data and logic signals. A central processing unit (CPU) senses when the power is turned on, and sends a reset signal to the print head over the second connection to place the LED's in a safe state. If the second connection is not made, or if the wire to the connection is broken when power is applied to the print head via the first connection, the logic comes up in an unknown, scrambled state and the CPU does not know that the second connection is not made. Any LED's that were "on" would be damaged by the application of power.

Another adverse situation occurs upon so-called cycle dropout. If there is a temporary power loss or drop to the print head, the logic may become scrambled so that some LED's may not be in a safe state. Normally, the CPU is programed to sense a power drop and to send a reset signal to the print head to bring the LED's to a known state so that there is no damage when full power is again applied. However, the logic on the print head may be more sensitive than the CPU so that a power drop sufficient to scramble the logic on the print head may be insufficient to cause the CPU to send a reset signal. Once again, those LED's that are not in their "safe" state will be damaged when full power is again applied.

DISCLOSURE OF INVENTION

It is an object of the present invention to provides for the protection of the recording elements in the event of a power drop even if no reset signal is received from the printer.

According to one aspect of the present invention, a dot printer includes a print head with a plurality of recording elements, a power supply for driving the recording elements, a source of logic supply voltage, a source of data signals, and means for supplying a first reset signal to the print head to place the recording elements in a safe state in the absence of data signals. A second reset signal source is provided on the print head to place the recording elements in a safe state in the absence of data signals if the logic supply voltage goes below a predetermined value.

According to a preferred embodiment of the present invention, the print head has a particular minimum logic supply voltage level at which response is guaranteed, and the predetermined value is approximately equal to the guaranteed minimum logic supply voltage level for the print head. Generally, the second reset signal is maintained until the logic supply voltage goes above a second predetermined value greater than the first predetermined value, and the second reset signal is maintained for a predetermined time delay after the logic supply voltage goes above the second predetermined value. Preferably, the first and second reset signals are logically OR'ed.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Because electrophotographic reproduction apparatus is well known, the present description will be directed in particular to elements forming part of or cooperating more directly with the present invention. Apparatus not specifically shown or described herein is selectable from those known in the prior art.

Figure 1:
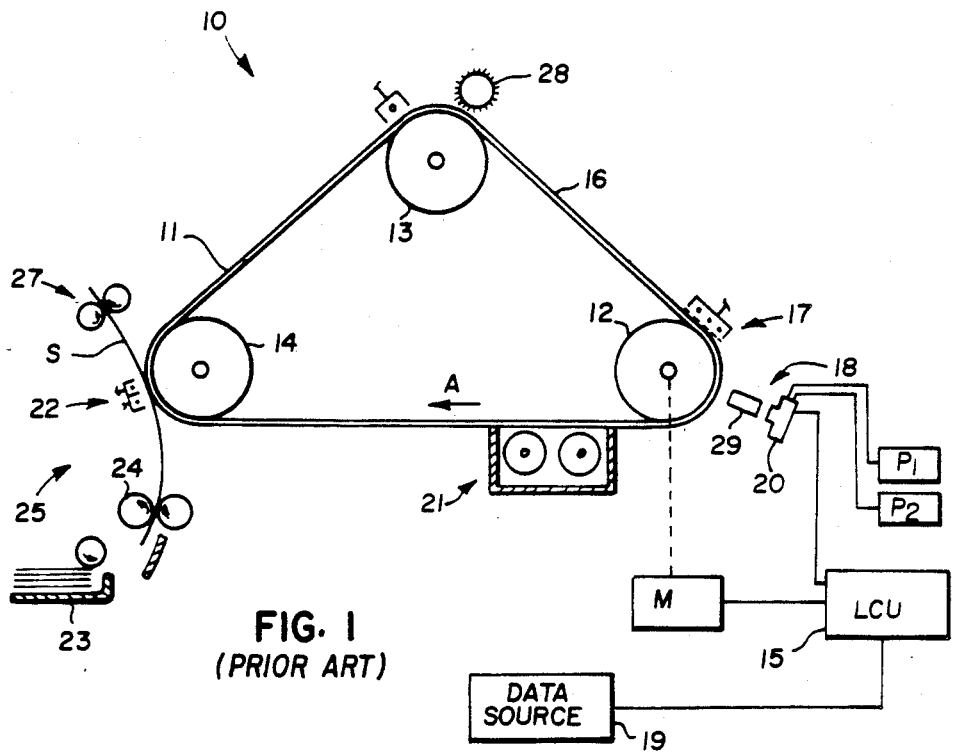
FIG. 1 is a schematic of a print apparatus made in accordance with the invention.

With reference now to FIG. 1, an electrophotographic reproduction apparatus 10 includes a recording medium such as a photoconductive web 11 or other photosensitive medium that is trained about three transport rollers 12, 13, and 14, thereby forming an endless or continuous web. Roller 12 is coupled to a driver motor "M" and moves web 11 in clockwise direction as indicated by an arrow "A". This movement causes successive image area of web 11 to sequentially pass a series of electrophotographic work stations of the reproduction apparatus.

First, a charging station 17 is provided at which a photoconductive surface 16 of web 11 is sensitized by applying thereto a uniform electrostatic primary charge of a predetermined voltage $V_0$ controlled by a logic and control unit (LCU).

At an exposure station 18, an electrostatic image is formed by modulating the primary charge on an image area of surface 16 with selective energization of point-like radiation sources in accordance with signals provided by a data source 19. The point-like radiation sources are supported in a print head 20 to be described in more detail below.

A development station 21 includes developer which may consist of iron carrier particles and electroscopic toner particles with an electrostatic charge. Developer is brushed over photoconductive surface 16 of web 11 and toner particles adhere to the latent electrostatic image to form a visible toner particle, transferable image. The development station may be of the magnetic brush type with one or two rollers. Apparatus 10 also includes a transfer station 25 shown with a corona charger 22 at which the toner image on web 11 is transferred to a copy sheet "S."

A copy sheet "S" is fed from a supply 23 to driver rollers 24, which then urge the sheet to move forward onto web 5 in alignment with a toner image at transfer station 25. After the transfer of the unfixed toner images to a copy sheet "S," the sheet is transported to a heated pressure roller fuser 27 where the image is fixed to the copy sheet "S." photoconductive surface 16 of the web 11 is cleaned of any residual toner particles remaining after transfer at a cleaning station 28.

Figure 2:
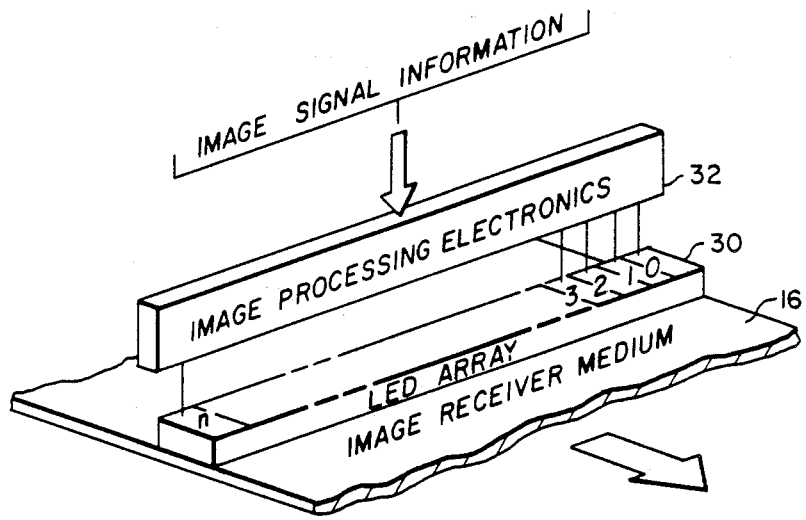
FIG. 2 is a perspective view illustrating the general arrangement of a prior art non-impact printer.

The apparatus for the herein disclosed invention is typified by the diagram of FIG. 2: a linear array 30 of triggerable recording elements such as light emitting diodes (LED's) is disposed to selectively expose photosensitive surface 16. Optical means for focusing light from the LED's onto the photosensitive surface may also be provided. In this regard, gradient index optical fiber devices such as Selfoc (trademark of Nippon Sheet Glass Co., Ltd.) arrays are highly suited. The LED's of the array are triggered into operation by means of image processing electronics 32 that are responsive to image signal information. Depending on the duration for which any given LED is turned on, the exposure effected by such LED is more or less made.

Figure 3:
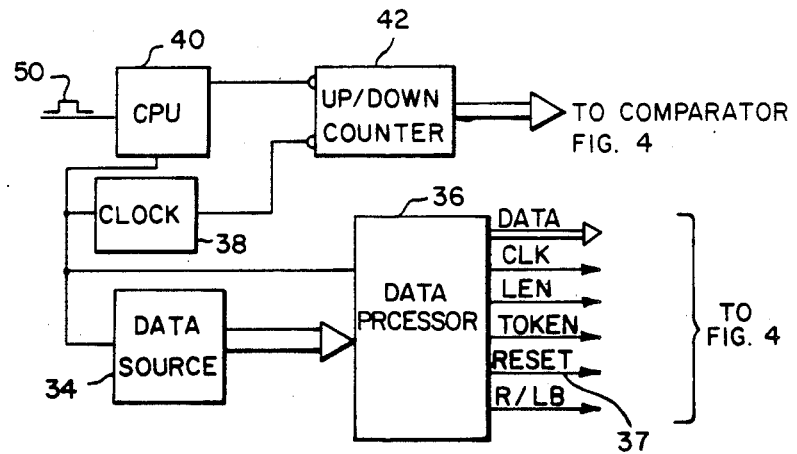
FIG. 3 is a block diagram of a circuit for providing signals to a non-impact print head made in accordance with the invention.

With reference now to FIG. 3, a data source 34 such as a computer, word processor, image scanner or other source of digitized image data, provides image data signals to a data processor 36 which may comprise a raster image processor. The data processor, under control of clock pulses and signals from a CPU 40 provides a plurality of outputs including rasterized data signals, a clock signal "CLK," a latch enable signal "LEN," a token bit, and a reset signal 37. A clock 38, in response to signals from CPU 40, provides clock pulses to an up/down counter 42 which, when enabled by a signal from the CPU, counts the clock pulses and provides at an output having a plurality of lines a digital signal representation of the state of the counter. Typically, such a counter has one line representing a least significant bit of such count and other lines representing other more significant bits.

In accordance with a technique fully described in U.S. Pat. No. 4,750,101 which issued on June 7, 1988 in the names of Ayers et al, the contents of which are incorporated herein by this reference, the output of counter 42 is provided via a first set of input terminals to a comparator 44 associated with each recording element 46. A plurality of data lines "y" are also provided to a second set of input terminals associated with each comparator. The comparators all compare the output of counter 42 with the value of the data.

The image data signals provided to each comparator relates to a desired ON time or period of enablement for a respective LED 46 for the recording of a particular pixel. As is well known, the LED's are generally alternately divided into odd and even-numbered LED's so that respective integrated circuit driver chips 48 therefor are located on opposite sides of the line of LED's. As the circuitry is similar for the corresponding driver chips, only one set is shown herein.

Figure 4A:
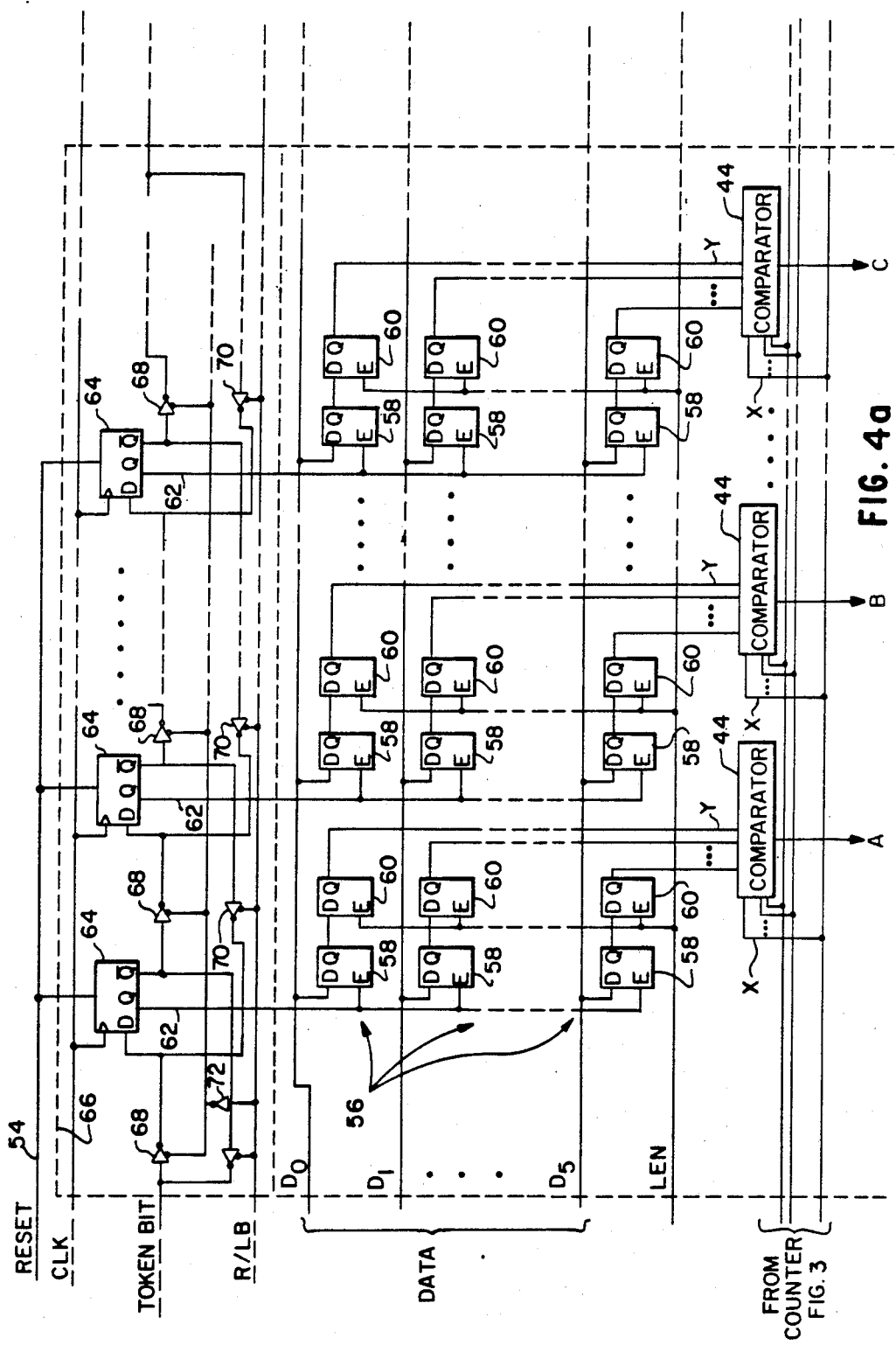
FIG. 4A and 4B are a schematic of a circuit for a non-impact print head in accordance with the invention.
Figure 4B:
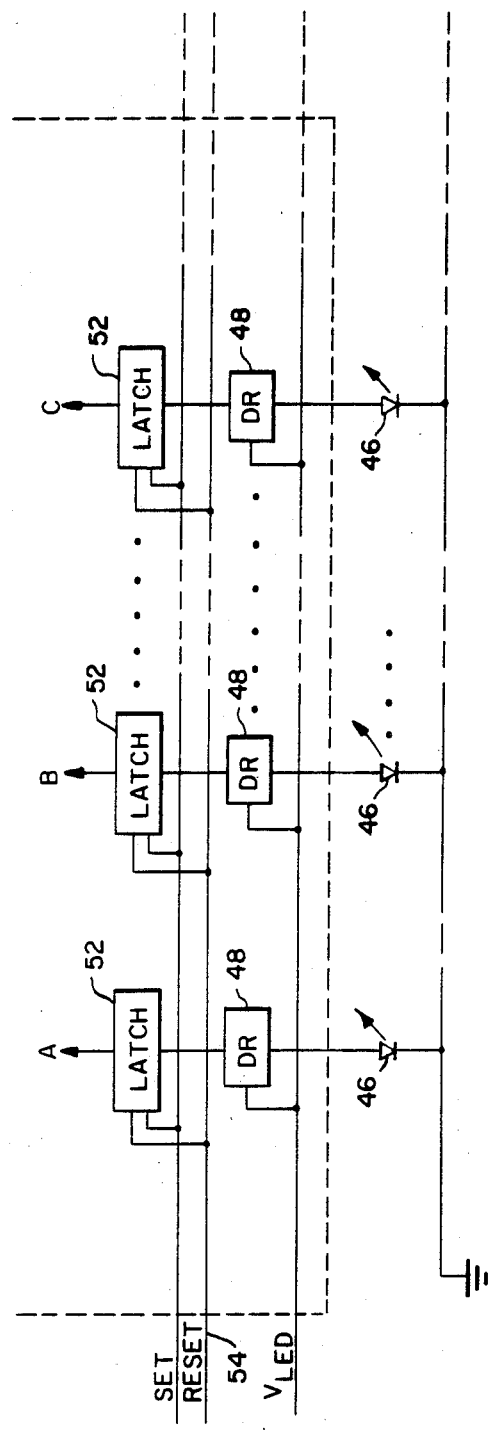

The image data signals provided to each comparator 44 during the printing of a single line of dots by the row of LED's is related to the desired pixel or dot size to be exposed onto the image receiver medium by that LED for that particular line of dots. As shown in FIG. 4, six independent lines of data $D_0$ through $D_5$ provide a six bit digital image data signal that allows for grey-scale variation of the output of each LED during each cycle of operation. During each cycle the data to each comparator may comprise six binary bits representing an amount from decimal zero to decimal sixty-three. Although the data lines $D_0$ through $D_5$ and other signal lines are shown passing through the driver chips, it will be appreciated that this is for the convenience of this description and that conventionally such lines are formed outside of the chips and connections made to these lines using "pads" or suitable connection points associated with the chips.

Suppose, for example, that the LED is to be enabled for a time period equal to nineteen clock periods plus $T_{MIN}$ where $T_{MIN}$ represents a pre-established minimum LED "ON" time. In response to a start of line pulse 50 (FIG. 3) the counter is enabled and commences to count from decimal sixty-three to zero. The six bit output of counter 42 is coupled to one set of inputs at terminal "X" of each of the comparators. This counter output is now compared with the data input at another set of inputs at terminal "Y" of this comparator which, for illustrative purposes is, say, binary form decimal ten. When there is a "match," i.e., when the count of terminal "X" is ten, a pulse is provided at the output terminal to cause a latch 52 to enable the appropriate driver 48 to commence and maintain current to LED 46.

After the counter counts down to zero, the counter is inhibited from counting additional clock pulses for a period $T_{MIN}$ that is either programmed into the counter or provided by other suitable means. After this predetermined time period $T_{MIN}$ the counter is set to count in its up mode and commences counting clock pulses again. When the counter, in its count up mode, reaches decimal ten, latch 52 is reset by a signal on line 54 as that electrical current to the LED ceases. The other LED's, operate in similar fashion.

The description of the circuitry forming a part of the driving circuitry for distributing the image data signals to the appropriate comparator will now be described. It being understood, of course, that the invention in its broader aspects contemplates circuits that do not employ a comparator to control enablement of "ON" time.

The image data signals are output by data processor 36. Data lines D through $D^5$ are independent lines each carrying a signal representing a digital bit (zero or one) so that together their respective signals define a digital six bit number from decimal zero to decimal sixty-three. This image data signal is passed along lines $D_0$ through $D_5$ which comprises an image data signal bus. Associated with each LED is a data register means 56 for latching data from this bus during each cycle of operation for printing a single line of dots. As will be described, a token bit is used to enable a data register means associated with a particular LED to accept the data while other data register means associated with other LED's await their respective data.

Data register means 56 for each LED comprises a pair of latches 58 and 60 or bi-stable multivibrators for each of the six data lines $D_1$ through $D_5$. The pair of latches are connected in a matter-slave relationship wherein, in response to a token bit signal at the enable input terminal of matter latch 58, an image data signal at the data input terminal of master latch 58 will cause the out-put of the master latch to either change or remain the same depending upon the image data signal. It will be noted that the six (only three of which are of each LED are commonly connected by line 62 (noninverted output line of a flip-flop 64) to simultaneously receive the token bit signal from the token bit shift register 66.

Token bit shift register flip-flops 68 which have clock pulses applied to the clock terminals hereof and have the signal representing the token bit input applied to the data input terminal of each. The Q-BAR (inverted)

output of each flip-flop 64 is connected to the data input terminal of the next flip-flop in the series through a tri-state inverter 68. A duplicate connection is made in the opposite direction through tristate inverters 70 so that programmable control may be made of the direction for shifting the token bit along token bit shift register 66.

In the example, when the token bit is to be shifted from left to right in FIG. 4 the line R/LB (right-left bit) is made logic high causing the output of its respective inverter 72 to go to logic low. This provides an enable signal to tristate inverters 68 and they operate as normal inverters. Tristate inverters 70 are "not enabled" and provide a high impedance or near open circuit condition at their outputs.

Thus, in response to clock pulses from data processor 36 the token bit is passed from stage to stage of token bit shift register 66 and accordingly outputted sequentially for enablement of master latches 58 of a respective data register 56. With movement of the token bit from stage to stage of the shift register 66, the data bits occurring on lines $D_0$ through $D_5$ are accepted by data registers 56 in turn from left to right until all the data registers have acquired their respective six bits of data.

A latch enable signal "LEN" is then applied to cause the respective slave latches 60 to latch the data at their respective outputs. The respective outputs of slave latches 60 are now communicated to the data input &terminals Y of the respective comparators 44 for determining the duration of exposure for each LED in accordance with the techniques described above. Master latches 58 are now free to receive the image data signals for the next line of dots to be recorded.

As mentioned above, latches 52 are reset by a signal from data processor 36 when counter 42 reaches decimal ten so that LED drivers are put in a known state with the LED's OFF. This occurs between print lines. At the same time, the reset signal removes the token bits being shifted across shift register 66. Thus, the reset signal effectively wipes the print head clean to await data for the next print line.

CPU 40 also provides a reset signal via data processor 36 in response to a "power up" situation so that the LED drivers are configured in a known state with the LED's OFF. This protects the LED's, which, in the absence of data signals, would come up in random states; some ON and some OFF. The LED's which were ON would soon burn out.

CPU 40 further provides a reset signal in response to a power drop in which the LED logic supply voltage falls below a trip point below which the CPU recognizes that the LED driver logic may become scrambled (i.e., random). Such power drops may, for example, be caused by power brown-outs, etc.

There are several situations wherein the LED states may become scrambled but the print head does not receive a reset signal from the CPU. For example, each print head has a particular minimum LED logic supply voltage level at which the manufacturer guarantees response. If the original print head is replaced with another having a minimum guaranteed LED logic supply voltage level higher than that of the original, a power drop sufficient to scramble the LED logic may be insufficient to initiate a reset signal from CPU 40. Another possibility wherein a reset signal is not received from the CPU could result from an assembly or repair person not physically connecting the reset line to the print head; or if the line were damaged. Yet another possibility could result from a momentary loss of the logic supply voltage to the print head that is not detected by the CPU; such as for example, due to a weak connection between data processor 36 and the print head.

By the present invention, protection for the LED's is provided even in such situations wherein the LED logic states become scrambled but the print head does not receive a reset signal from the CPU. The print head is provided with a reset signal generation function, independent of the printer's LCU and data processor, wherein the print head's reset signal generation function produces a reset signal whenever the LED logic supply voltage crosses the minimum level at which the manufacturer of the LED logic guarantees response.

Figure 5:
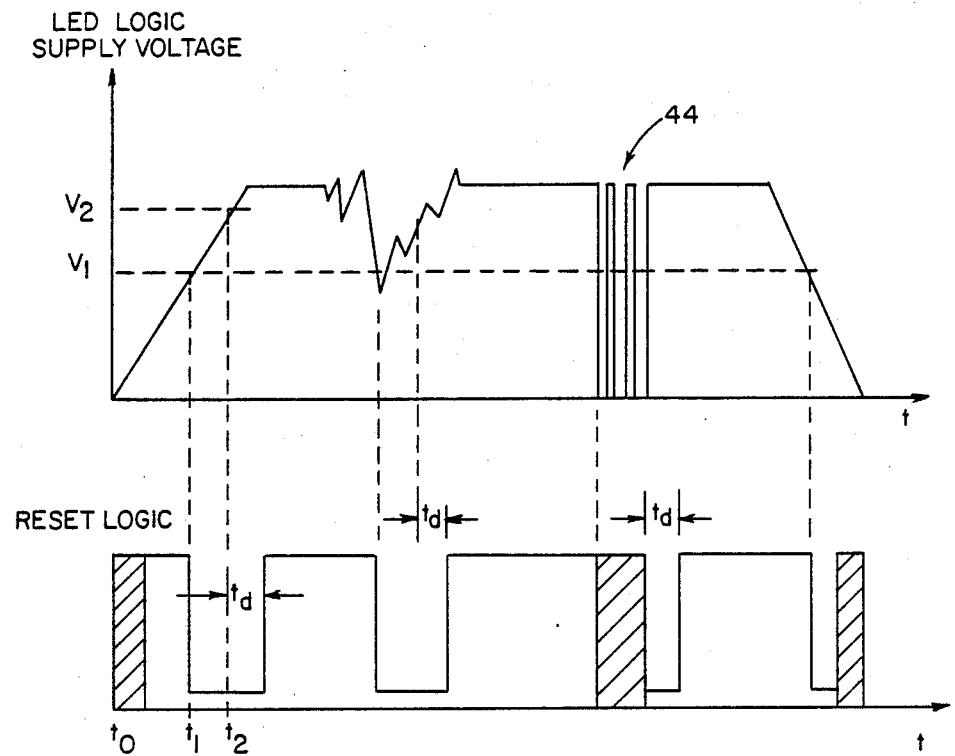
FIG. 5 is a graph of an LED logic supply voltage curve over time and the associated reset signals.

FIG. 5 illustrates a hypothetical LED logic supply voltage curve over time, and further shows the logic level to the reset line from data processor 36. During a "power up" operation, the LED logic supply voltage rises from time $t_0$ until, at time $t_1$, the voltage reaches the minimum logic supply voltage level $V_1$ at which the manufacturer of the LED logic guarantees response. During power up, a logic reset signal is generated by the reset signal generation function to place the LED's in a safe state. It is recognized that at very low logic supply voltages, the reset logic is undefined, as illustrated by the cross-hatched regions of FIG. 5.

The reset logic signal remains on until the logic supply voltage exceeds a guardband level $V_2$ plus a finite period $t_d$. The guardband insures that system noise does not cause removal of the reset signal if the logic supply voltage fluctuates across $V_1$, while period $t_d$ prevents removal of the reset signal during reconnection of the logic circuit as illustrated in region 44.

Each time the LED logic supply voltage crosses the minimum level $V_1$ at which the manufacturer of the LED logic guarantees response, the reset signal is actuated from the reset signal generating circuit on the print head. Thus, the reset signal is produced regardless of the integrity of the connections to CPU 40, and the logic supply voltage at which actuation occurs is selectable to match the particular print head characteristics.

Figure 6:
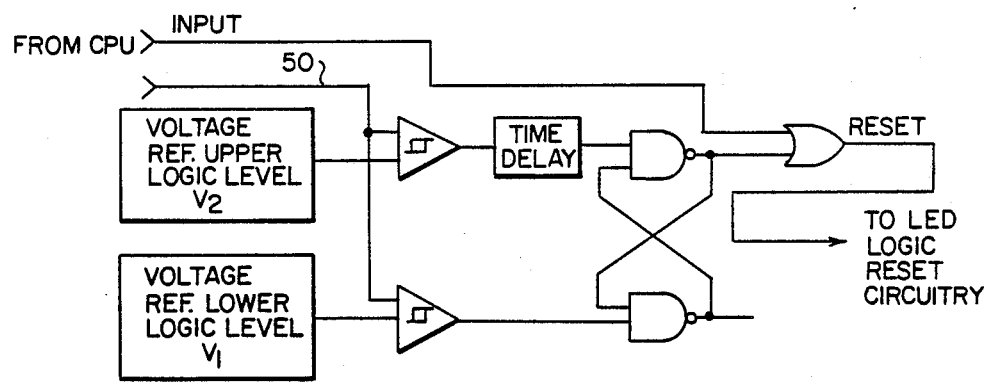
FIG. 6 is a schematic diagram of a circuit for producing a reset signal.

Referring to FIG. 6, LED logic supply voltage 50 is compared with the minimum logic supply voltage level $V_1$ at which the manufacturer of the LED logic guarantees response. When the supply voltage equals reference voltage $V_1$, a device 52 such as a Schmitt trigger, produces an output signal which is logically OR'ed with the reset signal from the CPU. The LED logic supply voltage is compared with the guardband reference $V_2$ so that the reset signal is deactivated when the guardband is exceeded and time delay $t_d$ has expired.

The invention has been described in detail with particular reference to preferred embodiments thereof, but it will be understood that variations and modifications can be effected within the spirit and scope of the invention.

What is claimed is:
1. A dot printer comprising:
a print head with a plurality of recording elements;
a power supply for driving the recording elements;
a source of logic supply voltage;
a source of data signals;
means for supplying a first reset signal to the print head to place the recording elements in a safe state in the absence of data signals; and
means on the print head for supplying a second reset signal to the print head to place the recording ele- ments in a safe state in the absence of data signals if the logic supply voltage goes below a predetermined value.

2. A dot printer as defined in claim 1 wherein:
the print head has a particular minimum logic supply voltage level at which response is guaranteed; and
the predetermined value is approximately equal to the guaranteed minimum logic supply voltage level for the print head.

3. A dot printer as defined in claim 1 further comprising means for maintaining the second reset signal until the logic supply voltage goes above a second predetermined value greater than the first predetermined value.

4. A dot printer as defined in claim 3 further comprising means for maintaining the second reset signal for a predetermined time delay after the logic supply voltage goes above the second predetermined value.

5. A dot printer as defined in claim 1 wherein the first and second reset signals are logically OR'ed.

6. For use with a dot printer of the type having a power supply, a source of logic supply voltage, a source of data signals, and means for supplying a first reset signal to place the printer in a safe state in the absence of data signals; and a print head comprising:
a plurality of recording elements;
means for supplying a second reset signal to place the recording elements in a safe state in the absence of data signals if the logic supply voltage goes below a predetermined value.

7. A print head as defined in claim 6 wherein:
said print head has a particular minimum logic supply voltage level at which response is guaranteed; and
the predetermined value is approximately equal to the guaranteed minimum logic supply voltage level for the print head.

8. A print head as defined in claim 6 further comprising means for maintaining the second reset signal until the logic supply voltage goes above a second predetermined value greater than the first predetermined value.

9. A print head as defined in claim 8 further comprising means for maintaining the second reset signal for a predetermined time delay after the logic supply voltage goes above the second predetermined value.

10. A print head as defined in claim 1 wherein the first and second reset signals are logically OR'ed.

11. A print head having:
means for receiving a logic supply voltage; and
reset signal generation means for producing a reset signal when the logic supply voltage crosses a predetermined level.

12. A print head as defined in claim 11 wherein:
said print head has a particular minimum logic supply voltage level at which response is guaranteed; and
the predetermined value is approximately equal to the guaranteed minimum logic supply voltage level for the print head.

* * * * *